Sept. 18, 1945.  A. EDDY  2,384,901

PICK COUNTING DEVICE

Original Filed Oct. 24, 1941   2 Sheets-Sheet 1

INVENTOR:
Arnold Eddy
BY
his agent

Sept. 18, 1945.  A. EDDY  2,384,901
PICK COUNTING DEVICE
Original Filed Oct. 24, 1941  2 Sheets-Sheet 2
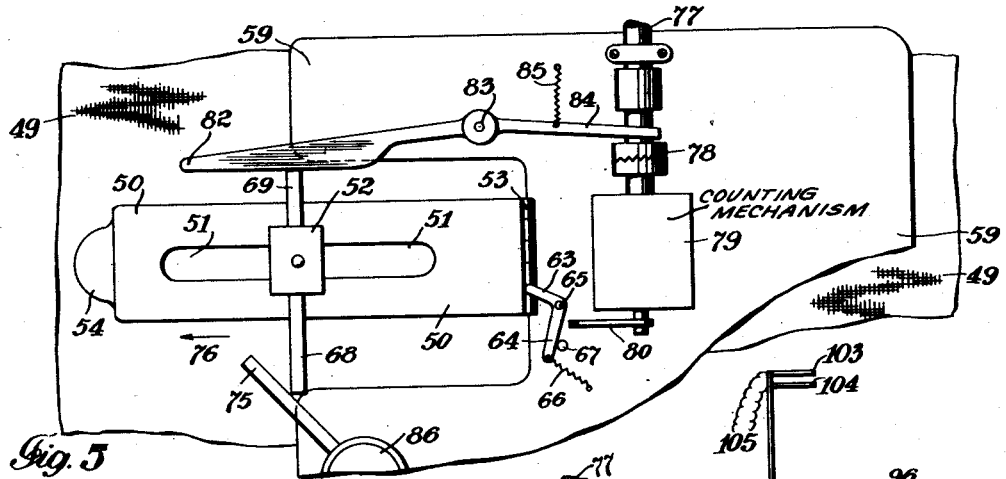
INVENTOR:
Arnold Eddy Patented Sept. 18, 1945

2,384,901

UNITED STATES PATENT OFFICE 2,384,901

PICK COUNTING DEVICE

Arnold Eddy, Middletown, Conn., assignor, by direct and mesne assignments, of fifty per cent to Hilda W. Striker and twenty per cent to E. G. Dentay, both of New York, N. Y.

Original application October 24, 1941, Serial No. 416,289. Divided and this application June 4, 1943, Serial No. 489,630

8 Claims. (Cl. 235—132)

The present invention relates to devices for counting the number of picks in a fabric as the same is being woven on a loom and is a division of application 416,289, filed October 24, 1941 and now Patent Number 2,326,769 dated August 17, 1943.

This invention has for its object to provide a simple and efficient device for counting the number of picks per unit of length, e. g. per inch, in a fabric, the construction of the device being such that, without any calculation, it can be promptly ascertained from the reading of the instrument whether or not the fabric is being woven according to the requirements as to the number of picks per inch.

Another object of the present invention consists in providing a counting and indicating device which enables direct reading of the number of picks per unit of length and which instrument can be put into operation easily by hand and automatically stops operation after counting the number of picks in the required way.

Still another object of the present invention consists of providing a pick-counting device which can be permanently mounted on a loom and put into operation at any time when it is desired to know whether the fabric is being woven according to the requirements.

A further object of my invention consists of a mainly mechanical counting mechanism which is of sturdy construction and adapted to operate even under the hardest working conditions.

With the above objects in view, my present invention chiefly consists of a pick-counting device which indicates the distance covered by the woven fabric while a certain predetermined number of picks is put into the same. It is easy to understand for everybody skilled in this art, that if such a distance is known, there is no difficulty to calculate the number of picks per predetermined length of fabric, e. g. the number of picks per unit of length. Thus, the indicating mechanism of my pick-counting device may not only indicate the distance covered by the fabric while a certain predetermined number of picks is put into the fabric, but it may be provided with an additional scale indicating the number of picks per unit of length corresponding to each distance covered by the fabric while a certain number of picks is put into the same; it is also possible to omit entirely on the scale the indication of distances covered by the fabric and to provide the scale only with the corresponding number of picks per unit of length.

This embodiment of my invention comprises in combination operating means adapted to be connected by hand with the woven fabric and thus to move along with the same, and an indicating mechanism actuated by this operating mechanism while the same is moving together with the fabric; thus this indicating mechanism is adapted to indicate that length of fabric which is woven while the indicating mechanism is actuated by the operating means. This embodiment, furthermore, comprises a part of the loom carrying out the same movement each time one pick is put into the fabric, a timing mechanism adapted to be driven by this loom part and to disconnect the above mentioned operating means from the fabric after this loom part has carried out a predetermined number of movements from the moment it has started to drive this timing mechanism, and a coupling adapted to connect this loom part and the timing mechanism; a further part of the new combination are means adapted to engage the coupling mentioned above at the moment the indicating mechanism is coming into contact with and its operation is started by these operating means, and to disengage this coupling at the moment the timing mechanism disconnects the operating means from the fabric.

As stated above, the operating means must be adapted to be connected by hand with the fabric while it is woven. From the point of view of the present invention, direct connection between the operating means and the fabric is not of eminent importance: It is only necessary that the operating means be connected with a moving loom part which is moving during weaving at constant speed.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 5 is a plan view of the device shown in Fig. 1 during the counting operation;

Fig. 6 is a plan view of the device at the moment the counting operation ends;

Fig. 7 is a plan view of a device similar to the one shown in Figs. 1 to 6, equipped with electrical coupling means;

Fig. 8 is an end view of a part of this device seen in direction of arrow 17 on Fig. 7; and Fig. 9 is a side view of the same part of this device, seen in direction of arrow 18 on Fig. 7.

Figure 1:
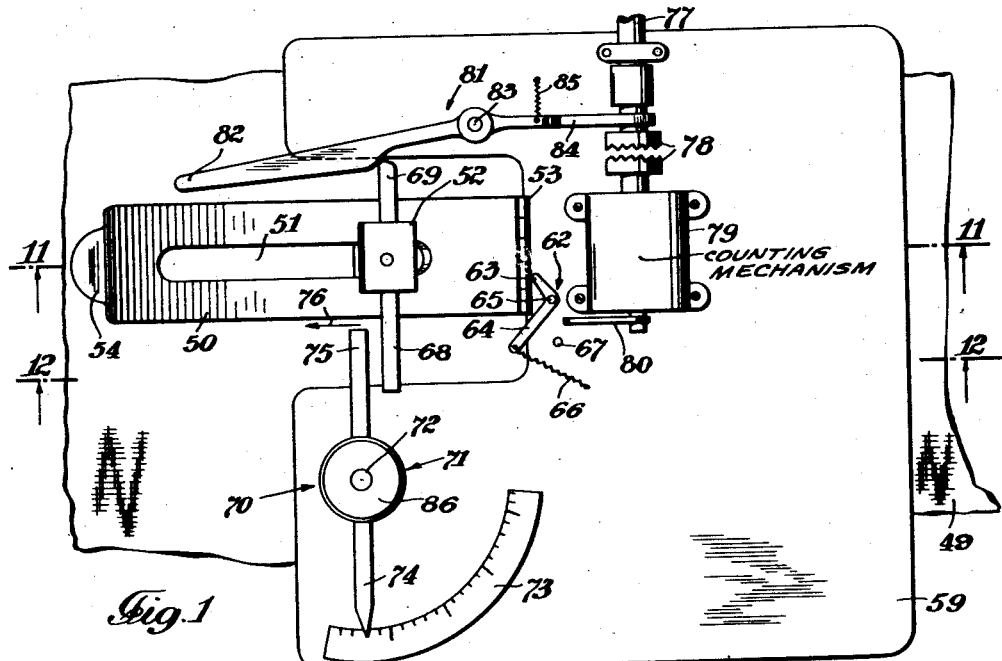
Fig. 1 is a plan view of an embodiment of my pick-counting device especially adapted to indicate the length of a fabric woven while a certain predetermined number of picks is put into this fabric.

An embodiment of my pick-counting device is shown in Figs. 1 to 6. As explained above, this embodiment of my invention is particularly adapted to count the length of the fabric woven while a certain number of picks is put into the fabric. In view of the fact, however, that this value is proportional to the number of picks per unit of length, I may either provide the indicating mechanism of the arrangement described below with an additional scale indicating also the number of picsk per unit of length, or, I may omit the scale indicating the woven length altogether and provide only one scale indicating the number of picks per unit of length.

This embodiment comprises means adapted to be connected by hand with the fabric 49 and to move along with the same. This fabric measuring mechanism consists of a tiltable base plate 50 with slot 51 in which a sliding member 52 is moving together with the fabric. This base plate 50 is tiltable about hinges 53 and the sliding member 52 is not pressed independently from base plate 50, but together with the same against fabric 49. This is done by pushing projection 54 of base plate 50 in direction of arrow 55, thereby engaging pins 56 of the sliding member 52 with the fabric 49. The leaf spring 57 secured by means of screws 58 or the like to the stationary support 59 is pressing with its free end 60 in direction of arrow 61 against the tiltable base plate 50 and is holding thereby this plate in its upward-tilted position shown in Fig. 2. Spring 57, however, is not attached to the tiltable base plate 50 and thus, by pressing projection 54 downward in direction of arrow 55, this plate can always be brought into operative position with pins 56 engaging fabric 49.

The blocking lever 62 serves for holding the tiltable plate 50 in operative, downward-tilted position as long as necessary for counting purposes. This blocking lever consists of a blocking lever arm 63 and an operating lever arm 64, both turnably secured by means of pivot 65 to the stationary support 59. Spring 66 permanently tends to turn the lever 62 into the position shown in Fig. 4. The stop pin 67 serves for limiting the turning movement of lever 62. This blocking lever 62 holds the tiltable plate 50 and sliding member 52 in operative position until turned against action of spring 66 in clockwise direction, disengaging thereby the tiltable plate 50, which then returns by action of spring 57 into its position shown in Fig. 2.

As shown in Fig. 1, the sliding member 52 is provided with two projections 68 and 69. Projection 68 serves for actuating the indicating mechanism 70 indicating the length of the fabric measured by the above described fabric measuring mechanism. This indicating mechanism consists of a double-armed indicating lever 71, pivoted by means of pivot 72 to the stationary support 59 and scale 73 along which moves lever arm 74 serving as indicating pointer when lever arm 75 is pushed by means of projection 68 in direction of arrow 76, as indicated in Fig. 5. It must be pointed out that lever arm 75 is arranged in that plane in which projection 68 is moving when the tiltable plate 50 is tilted downward, as shown in Figs. 4 and 5; when base plate 50 and sliding member 52 are tilted upward, lever arm 75 and projection 68 are not in engagement, as shown in Fig. 3. In this upward-tilted position, the sliding member 52 is unable to actuate the indicating mechanism 70; thus, if sliding member is actuating the indicating mechanism, this actuation is stopped by movement of this member into the upward-tilted position. In this way, the indicating mechanism is adapted to indicate only that distance which the sliding member 52 covers from the moment of engagement between projection 68 and lever arm 75 until the moment when the sliding member 52 together with the tiltable plate 50 return into the upward-tilted position shown in Fig. 2. It is, therefore, important that an operating mechanism be provided adapted to tilt measuring mechanism consisting of the tiltable plate 50 with sliding member 52 upwards when a certain predetermined number of picks has been put into the fabric from the moment the sliding member 52 has started actuation of the indicating mechanism 70.

This operating mechanism consists of shaft 77 revolving once each time one pick is put into the fabric, a slidable coupling or clutch 78 adapted to connect shaft 77 with counting mechanism 79, a disconnecting lever 80 adapted to disengage the blocking lever 62 after shaft 77 has carried out a certain predetermined number of revolutions, and the double-armed operating lever 81; this latter lever must be adapted to engage the cooperating members of clutch 78 at the moment the indicating mechanism is coming into contact and its operation is started by the sliding member 52, and to disengage the cooperating members of clutch 78 at the moment or after the counting mechanism 79 disconnects the sliding member 52 from fabric 49, as explained below.

The arrangement of the double-armed lever 81 is similar to that of lever arm 75 of the indicating mechanism 70; this means that the lever arm 82 of the double-armed lever 81 secured by means of pivot 83 to the stationary support 59 comes into contact with projection 69 of the sliding member 52 at the same moment when projection 68 strikes against lever arm 75. Thus, by means of lever arms 82 and 84, clutch 78 is engaged and operation of the counting mechanism 79 is started at the same moment as the indicating mechanism 70 starts to operate.

The details of the counting mechanism 79 are not shown in particular, as such mechanisms are well known to everybody skilled in this art. It should only be mentioned that this mechanism has to work in such a manner as to automatically turn the disconnecting lever 80, which usually is in upward-turned position shown in Fig. 1, after clutch 78 has been engaged and it has counted a certain predetermined number of impulses caused by shaft 77 while the same has carried out a certain predetermined number of revolutions; during its downward-turning, lever 80 strikes lever arm 64 of the double-armed blocking lever 62, turning thereby this lever into inoperative position and making upward tilting of the tiltable base plate 50 possible.

As stated above, in the embodiment described, shaft 77 revolves once each time one pick is put into the fabric. It must be stressed that this shaft may be a part of the counting mechanism 79; in that case it has to be connected by coupling means to a part of the loom performing an identical movement during weaving of each filling pick in such a manner as to revolve once during weaving of each pick.

It should be noted that this shaft might, however, be also a part of the loom e. g. the main loom shaft or another shaft performing an identical revolution during weaving of each filling pick. Also in this case there must be coupling means to connect this shaft with the counting mechanism 79.

It must furthermore be stressed that it is not essential for the shaft to perform a full rotation each time one pick is put into fabric: It may as well carry out a part rotation while one pick is being put into the fabric; in this case, however, the indicating device has to be built in a corresponding manner, i. e. it has to indicate during one rotation of shaft 77 the correct corresponding number of picks put into the fabric. In the same way, while the picks are being put into the fabric, this "loom part" may perform a reciprocating movement, and the counting mechanism 79 may count the number of these movements.

It should furthermore be noted that the counting mechanism 79 might be constructed in such a manner as to automatically strike lever arm 64 after having counted a certain predetermined number of impulses; in this case, it is not necessary that the counting mechanism be disconnected from shaft 77 exactly at the moment where this rotating shaft has created in the counting mechanism this predetermined number of impulses corresponding to the predetermined number of filling picks, but it is possible to operate clutch 78 also after operation of the fabric measuring and indicating mechanism has ceased.

Figure 2:
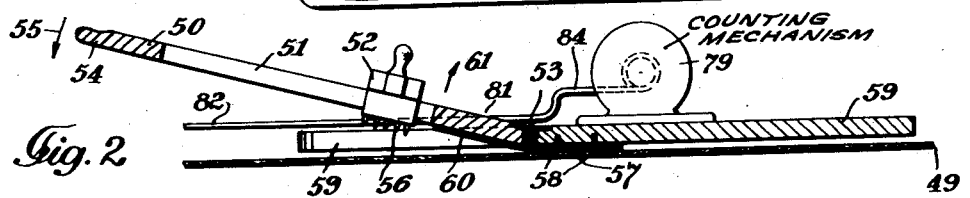
Figure 2 is a cross section of the device shown in Figure 1 along line II of this figure, partly in elevation.
Figure 3:
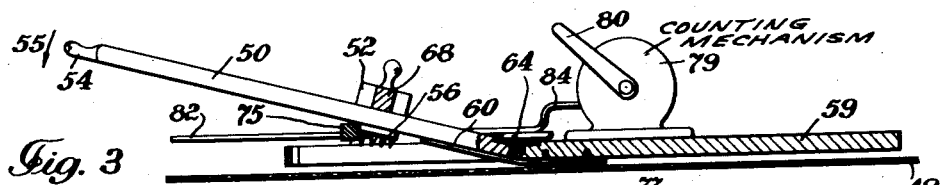
Figure 3 is a cross section of the same device partly along line 12—12 and partly along line 11—11 of Fig. 1.
Figure 4:
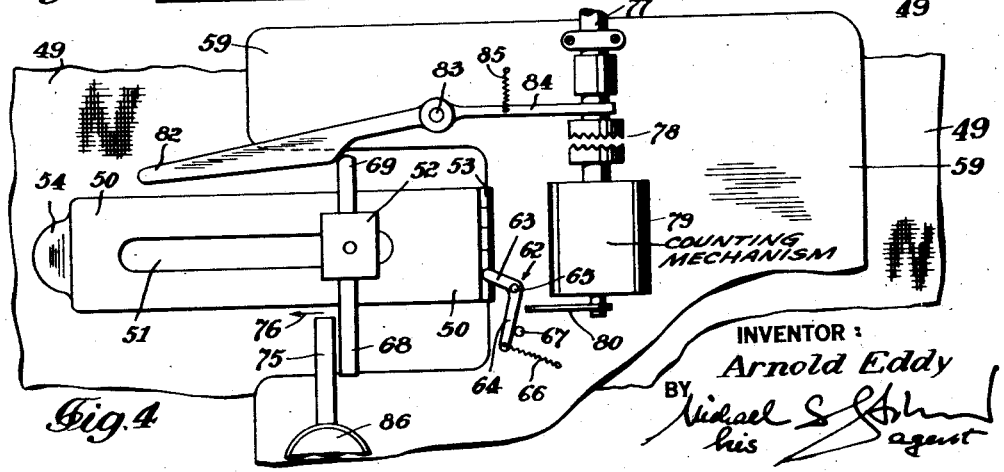
Fig. 4 is a plan view of the embodiment shown in Fig. 1 at the moment the counting operation starts.

This embodiment of a pick-counting mechanism operates as follows:

In its initial inoperative position, the tiltable base plate 50 is turned upward, as shown in Figs. 1 to 3. In this position, pins 56 are not in engagement with fabric 49.

The counting operation is started by pushing projection 54 of the tiltable plate 50 downward in direction of arrow 55. At the moment the tiltable plate 50 reaches a position in which pins 56 engage fabric 49, blocking lever 62 turns into the position shown in Fig. 4, forcing thereby the tiltable plate 50 to stay in turned-down position.

Then, the sliding member 52 starts to move along with fabric 49 and strikes with its projections 68 and 69 simultaneously against lever arm 75 of the indicating mechanism 70 and lever arm 82 of lever 81, respectively. (Fig. 4.) By striking against lever arm 75, operation of the indicating mechanism is started; by striking against lever arm 82, coupling 78 is closed and the counting mechanism 79 operates, Fig. 5. At the moment shaft 77 has carried out the predetermined number of revolutions after engagement of clutch 78, the disconnecting lever 80 of the counting mechanism 79 strikes against lever arm 64 of the blocking lever 62 and disconnects the same from the tiltable base plate 50. (Fig. 6.) This disconnection has the following consequences: Base plate 50, not blocked by lever 62, is forced by leaf spring 57 to return into its tilted inoperative position shown in Figs. 1 to 3. Thereby both projections 68 and 69 become disengaged from the corresponding lever arms 75 and 81, respectively. Disengagement of lever arm 75 causes stopping of the indicating mechanism 70. Disengagement of lever arm 82 enables spring 85 to turn lever 81 back into inoperative position shown in Fig. 1, disengaging thereby the cooperating members of clutch 78. This latter fact results in stopping of the counting mechanism 79 and return of lever 80 into its inoperative position shown, for instance, in Figs. 4 and 5. The counting mechanism 79 is constructed in such a manner that in case of disengagement of clutch 78 lever 80 automatically returns into its inoperative position so that the counting mechanism is ready for the next counting operation. The sliding member 52 automatically resumes its initial position shown in Figs. 1 to 3, after tilting-upward of base plate 50; this is due to the own weight of this member, causing it to slide along the sloping surface of the tilted base plate 50. After reading of the indication on scale 73, the indicating lever 71 is returned by means of knob 86 into its initial position, shown in Fig. 1.

Another embodiment of my invention is shown in Figs. 7 to 9. The indicating mechanism 70, shaft 77, and clutch 78 are of the same construction and serve the same purpose as the corresponding parts of the embodiment shown in Figs. 1 to 6; therefore, these parts will not be described in detail. Also the construction of the tiltable base plate 50 and sliding member 52 is similar to the construction described above. The sole difference is that the tiltable plate 50 is made of insulating material and the projection 87 of the sliding member 52 is made of metal and is adapted to slide along the contact strips 88 and 89 of the electric circuit 90. This electric circuit comprises besides the contact strips 88 and 89, the source of electric current 91 and the electromagnet 92 co-operating with the lever arm 93 operating clutch 78. If energized electromagnet 92 turns lever arm 93 in the direction of arrow 95, engaging thereby the cooperating members of clutch 78. Spring 94 tends to turn lever arm 93 against the direction of arrow 95 and to disengage thereby clutch 78. Thus, this electrical arrangement engages the cooperating members of clutch 78 at the moment the projection 87 of sliding member 52 closes the circuit between the contact strips 88 and 89 and disengages these cooperating clutch members at the moment the base plate 50 with sliding member 52 is tilted upward and the electrical connection between the contact strips 88 and 89 is broken. This makes it possible to arrange the base plate 50 and indicating mechanism 70 at any desired distance from shaft 77 and coupling 78.

In Figs. 7 to 9, I have also shown a practical embodiment of a timing mechanism; this timing mechanism consists of a small pinion 96 secured to shaft 97. This shaft 97 is journalled in a wall 98 connected to the stationary support 99 and connected to one of the cooperating members of clutch 78.

Pinion 96 cooperates with the vertically arranged slidable rack 100. At a certain distance above rack 100, the contact members 103, 104 form part of the electrical circuit 105 operating electromagnet 106. When this electromagnet is energized, it turns blocking lever 62 in clockwise direction, disconnecting this lever from base plate 50 and allowing the latter to resume its upward-tilted inoperative position. The above mentioned pinion 96 and rack 100 serve for closing the circuit 105 and energizing the electromagnet 106. When clutch 78 is engaged, pinion 96 starts to rotate in direction of arrow 101, pushing rack 100 upward, in direction of arrow 102, until it strikes contact member 104, forcing it in contact with member 103, closing thereby circuit 105 and energizing electromagnet 106. The energized electromagnet disconnects blocking lever 62 from base plate 50 and the latter returns into its upward-tilted position. By this upward-tilting movement of base plate 50 circuit 90 is opened and electromagnet 92 deenergized, enabling lever 93 to return into its inoperative position disengaging clutch 78. When clutch 78 is disengaged, rack 100 drops by its own weight into its lowest position, shown in Fig. 8, and is then again ready for operation. By adequately calculating the distance between the upper edge of rack 100 when the same is in its lowest position and the lower face of contact member 104, it is possible to determine the number of revolutions which shaft 97 and shaft 77, respectively, have to carry out before rack 100 strikes contact member 104 disengaging the blocking lever 62 and stopping operation of indicating mechanism 70.

It will be understood that each of the elements described above, or two or more together, may also find a useful application in other types of pick counting devices differing from the types described above.

While this invention is illustrated and described as embodied in devices for counting the number of picks, it is not intended to be limited to the details shown, since various modifications and structural changes may be made without departing in any way from the spirit of my invention. Thus, for instance, it is stated in the preceding specification and following claims that the operating means for the sliding members must be adapted to be connected by hand to the fabric.

It should, furthermore, be mentioned that there are shown only sliding members provided with pins for connecting these sliding members to the fabric or a loom part moving at the same speed as this fabric; however, in the same way, there may also be used other means for connecting the sliding members to the fabric.

Without further analysis, the foregoing will so fully reveal the gist of this invention that others can by applying current knowledge readily adapt it for various applications without omitting features that, from the standpoint of prior art, fairly constitute essential characteristics of the generic aspects of this invention and, therefore, such adaptations should and are intended to be comprehended within the meaning and range of equivalence of the following claims.

What is claimed as new and desired to be secured by Letters Patent is:

1. Device for counting and registering the number of picks in a unit length of fabric as said fabric is woven on a loom, comprising in combination a measuring and indicating mechanism constructed to measure and indicate the length of fabric woven on said loom, and a controlling mechanism constructed to influence said measuring and indicating mechanism so that the same measures and indicates only the length of the fabric woven during weaving of a certain predetermined number of filling picks, said controlling mechanism including a counting mechanism constructed and arranged so as to terminate operation of said fabric measuring and indicating mechanism after counting a certain predetermined number of impulses, and impulse creating means creating in said counting mechanism one of said impulses each time one filling pick is woven on said loom, said predetermined number of impulses divided by the length of fabric measured and indicated while said counting mechanism is counting said predetermined number of impulses being an indication of the number of picks in a unit length of fabric.

2. Device for counting and registering the number of picks in a unit length of fabric as said fabric is woven on a loom, comprising in combination a measuring and indicating mechanism constructed to measure and indicate the length of fabric woven on said loom, and a controlling mechanism constructed to influence said measuring and indicating mechanism so that the same measures and indicates only the length of the fabric woven during weaving of a certain predetermined number of filling picks, said controlling mechanism including a counting mechanism constructed and arranged so as to terminate operation of said fabric measuring and indicating mechanism after counting a certain predetermined number of impulses, and impulse creating means creating in said counting mechanism one of said impulses each time one filling pick is woven on said loom, and coupling means constructed and arranged to connect said counting mechanism with said impulse creating means whenever required and to disconnect them automatically after said counting mechanism has received said predetermined number of impulses from said impulse creating mechanism, said predetermined number of impulses divided by the length of fabric measured and indicated while said counting mechanism is counting said predetermined number of impulses being an indication of the number of picks in a unit length of fabric.

3. Device for counting and registering the number of picks in a unit length of fabric as said fabric is woven on a loom, comprising in combination a measuring and indicating mechanism constructed to measure and indicate the length of fabric woven on said loom, and a controlling mechanism constructed to influence said measuring and indicating mechanism so that the same measures only the length of the fabric woven during weaving of a certain predetermined number of filling picks, said operating mechanism including a counting mechanism constructed and arranged so as to terminate operation of said fabric measuring and indicating mechanism after counting a certain predetermined number of impulses, and a part of said loom performing an identical movement during weaving of each filling pick and constructed and arranged so as to create in said counting mechanism one of said impulses each time one filling pick is woven on said loom, said predetermined number of impulses divided by the length of fabric measured and indicated while said counting mechanism is counting said predetermined number of impulses being an indication of the number of picks in a unit length of fabric.

4. Device for counting and registering the number of picks in a unit length of fabric as said fabric is woven on a loom, comprising in combination a measuring and indicating mechanism constructed to measure and indicate the length of fabric woven on said loom, and a controlling mechanism constructed to influence said measuring and indicating mechanism so that the same measures and indicates only the length of the fabric woven during weaving of a certain predetermined number of filling picks, said controlling mechanism including a counting mechanism constructed and arranged so as to terminate operation of said fabric measuring and indicating mechanism after counting a certain predetermined number of impulses, a part of said loom performing an identical movement during weaving of each filling pick and constructed and arranged so as to create in said counting mechanism one of said impulses each time one filling pick is woven on said loom, and coupling means constructed and arranged so as to connect said counting mechanism with said loom part whenever required and to disconnect them automatically after said counting mechanism has received said predetermined number of impulses from said loom part, said predetermined number of impulses divided by the length of fabric measured and indicated while said counting mechanism is counting said predetermined number of impulses being an indication of the number of picks in a unit length of fabric.

5. Device for measuring and registering the length of fabric woven while a certain predetermined number of filling picks is woven on a loom comprising in combination fabric measuring means constructed to be connected by hand with the woven fabric and to move along with the same, a registering mechanism constructed to register the distance covered by said fabric measuring means, said registering mechanism being actuated by said fabric measuring means only while the same is moving together with said fabric and is in contact with said registering mechanism, a part of said loom performing identical movements during weaving of each filling pick, a counting mechanism constructed to be driven by said loom part and to automatically disconnect said fabric measuring means from said fabric after said loom part has performed a certain predetermined number of said movements from the moment it started to drive said counting mechanism, a clutch mechanism constructed to connect and disconnect said loom part and said counting mechanism, and means actuated by said fabric measuring means for engaging said clutch mechanism at the moment said registering mechanism is coming into contact with and its operation is started by said fabric measuring means and for automatically disengaging said clutch mechanism after said counting mechanism has disconnected said fabric measuring means from fabric.

6. Device for measuring and registering the length of fabric woven while a certain predetermined number of filling picks is woven on a loom comprising in combination a first loom part moving during weaving with equal speed, fabric measuring means constructed to be connected by hand with said first loom part moving during weaving with equal speed and to move along with the same, a registering mechanism constructed to register the distance covered by said fabric measuring means, said registering mechanism being actuated by said fabric measuring means only while the same is moving together with said first loom part and is in contact with said registering mechanism, a second loom part performing identical movements during weaving of each filling pick, a counting mechanism constructed to be driven by said second loom part and to automatically disconnect said fabric measuring means from said first loom part after said second loom part has performed a certain predetermined number of said movements from the moment it started to drive said counting mechanism, a clutch mechanism constructed to connect and disconnect said second loom part and said counting mechanism, and means actuated by said fabric measuring means for engaging said clutch mechanism at the moment said registering mechanism is coming into contact with and its operation is started by said fabric measuring means and for automatically disengaging said clutch mechanism after said counting mechanism has disconnected said fabric measuring means from said first loom part.

7. In a device of the type claimed in claim 5, nism comprising a tiltable base plate arranged said fabric measuring means and said means for engaging and disengaging said clutch mechanear the surface of the woven fabric, a sliding member carried by said base plate and moving along with said fabric when said base plate is in downward-tilted operative position, a projection on said sliding member for actuating said registering mechanism, an electromagnet associated with said clutch mechanism constructed to engage the same when energized, an electrical circuit including said electromagnet and a source of current, a pair of stationary contact members arranged along one edge of said tiltable base plate and forming a point of interruption of said circuit, and a slidable contact projection on said sliding member constructed to connect said stationary contact members when said base plate is in downward-tilted operative position and said sliding member is sliding along the same, actuating said registering mechanism.

8. Device for counting and registering the number of picks in a unit length of fabric as said fabric is woven on a loom, comprising in combination a measuring and indicating mechanism constructed to measure and indicate the length of fabric woven on said loom, a combined controlling and counting mechanism constructed so as to terminate operation of said measuring and indicating mechanism after a certain predetermined number of impulses has been counted by said combined controlling and counting mechanism, and impulses creating means creating in said combined controlling and counting mechanism one of said impulses each time one filling pick is woven on said loom, said predetermined number of impulses divided by the length of fabric measured and indicated while said counting mechanism is counting said predetermined number of impulses being an indication of the number of picks in a unit length of fabric.

ARNOLD EDDY.